United States Patent Office 2,993,048
Patented July 18, 1961

2,993,048
SUBSTITUTED DIAMINOPURINES AND METHOD OF PREPARING THE SAME

William Shive, 843 E. 38th St., and Charles G. Skinner, Jr., 4405 Duval St., both of Austin, Tex.
No Drawing. Filed July 31, 1959, Ser. No. 830,711
5 Claims. (Cl. 260—252)

This invention relates to the preparation of 2-amino-6-substituted purines which are new compounds.

We have found that the introduction of a number of substituent groups into the 6-position of the 2-amino-6-(substituted)purine nucleus produces new compounds having unusual biological activities as compared to the parent members of the group, 2,6-diaminopurine and 2-amino-6-mercaptopurine. The new compounds were prepared by the thermal condsensation of 2-amino-6-methylthiopurine (J. Am. Chem. Soc., 79, 2188 (1957)) and a primary amine as illustrated in the following equation:

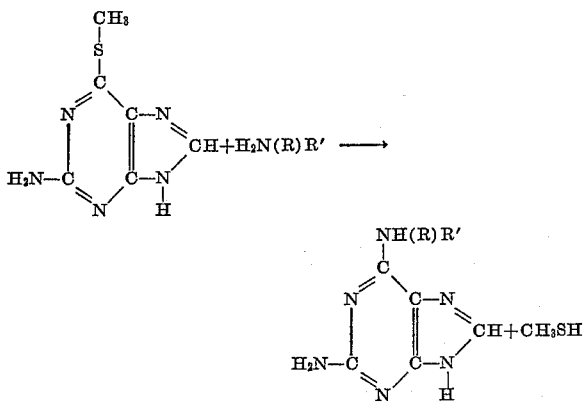

in which R is a lower alkylene radical and R' is phenyl or a mononuclear heterocyclic radical or substituted derivative thereof. The heterocyclic radical can be, for example, those such as furane, thiophene, pyridine and the like.

The reaction was carried out by mixing the primary amine with 2-amine-6-methylthiopurine and heating for several hours at about 150° C. This is conveniently carried out by sealing the reactants in a glass bomb during the reaction period. Solvents may be used; however, an excess of the amine is usually employed as the reaction solvent. The excess amine can be removed along with any solvent present, usually by distillation under reduced pressure. In the examples where the reaction product precipitated from the reaction mixture after the heating period, the solid was recovered and taken up in a suitable organic solvent for subsequent crystallization.

The physiological activities of the compounds of the present invention include a stimulation of the rate of seed germination as described in Example 7. In addition, these compounds are synergistic with (gibberellic acid) gibberellin in stimulating the rate of lettuce seed germination, as described in Example 8. The parent member of this series, 2,6-diaminopurine, does not possess any appreciable activity in this assay system. The techniques used to measure these effects are well established experimental procedures in which the seeds are pretreated with the particular compounds in a suitable manner and then placed in petri dishes on filter paper wet with water for germination. The methods of handling the seed during this pre-treatment period as well as the subsequent germination conditions are dependent upon the seed under study.

In a 2,4-diamino-6,7-diphenylpteridine-inhibited Lactobacillus arabinosus system (Arch. Biochem. Biophys., 73, 191 (1958)), the activities of the 2-amino-6-(substituted) purines were greater than the corresponding mono-aminopurine compounds; the relative activities of the present new compounds are summarized in Table I. The media and experimental procedure for these assays are described in Example 9.

TABLE I

| Compound | Weight of Compound per disc., µg. | Diameter of growth inhibition zone, mm. |
|---|---|---|
| 2,6-Diaminopurine | 40 | 28 |
| 2-Amino-6-benzylaminopurine | 40 | 37 |
| 2-Amino-6-(2-phenylethyl)-aminopurine | 40 | 38 |
| 2-Amino-6-(2-furfuryl)aminopurine | 40 | 39 |
| (Kinetin) | (40) | (33) |
| 2-Amino-6-(3-pyridylmethyl)-aminopurine | 40 | 30 |
| 2-Amino-6-(4-pyridylmethyl)-aminopurine | 40 | 23 |

The following examples illustrate in detail the preparation of the new 2-amino-6-substituted purines of the present invention.

Example 1
2-AMINO-6-BENZYLAMINOPURINE

One gram of 6-thioguanine was dissolved in one equivalent of 1 N sodium hydroxide with warming; after which, about 25 ml. of water was added, and the solution allowed to cool to room temperature. One equivalent of methyl iodide was added to the well stirred solution during a one hour period, and the reaction mixture was allowed to stir an additional two hours at room temperature. After standing in the refrigerator overnight, a precipitate formed which was recovered and dried under reduced pressure over phosphorus pentoxide to yield 0.98 g. of material, melting point 237–241° C. (dec.).

A mixture of 500 mg. of 2-amino-6-methylthiopurine prepared immediately above and about 4 ml. of benzylamine were sealed in a micro Carius tube and heated to about 165° for 14 hours. After the reaction mixture had cooled to room temperature, the bomb was opened and the reaction mixture was recovered using a small volume of acetone to rinse out the bomb. The combined solutions were then reduced to a small volume under reduced pressure and cooled in an isopropyl alcohol-Dry Ice bath for several hours to induce crystallization. The precipitate was recovered, recrystallized from acetone and then water, and finally dried under reduced pressure over phosphorus pentoxide to yield 410 mg. of product, melting point 229–232° C. (dec.).

EXAMPLE 2
2-amino-6-benzylthiopurine

Using the same preparative procedure described above for the methylthio-compound, 0.2 g. of 6-thioguanine after reaction with benzyl chloride gave 0.28 g. of product, melting point 207–209° C.

EXAMPLE 3
2-amino-6-(2-furfuryl)aminopurine

Using the condensation procedure described in Example 1 for the corresponding benzylaminopurine compound, 250 mg. of 6-methylthioguanine and 1.5 ml. of furfurylamine were heated at 150° C. for 12 hours. The reaction mixture was taken up in 20 ml. of cold ether, and the resulting brown oil was removed. The ether phase was reduced in volume and cooled in the refrigerator overnight to yield 77 mg. of product, melting point 206–208° C.

EXAMPLE 4

*2-amino-6-(3-pyridylmethyl)aminopurine*

Using the general procedure described for the benzyl compound above, 500 mg. of 6-methylthioguanine and 3 ml. of β-pyridylmethylamine were heated to 150° C. for 15 hours. The reaction mixture was reduced to dryness under reduced pressure and the residue was taken up in 20 ml. of ether. Upon cooling, a precipitate formed, which was taken up in 95% ethyl alcohol, decolorized with charcoal, and reduced to dryness again. The resulting residue was recrystallized from acetone to yield 185 mg. of product, melting point 251–253° C.

EXAMPLE 5

*2-amino-6-(4-pyridylmethyl)aminopurine*

A mixture of 500 mg. of 6-methylthioguanine and 3 ml. of γ-pyridylmethylamine were heated for 17 hours at about 150° C. as described above for the benzyl compound. The reaction mixture was taken up in acetone and cooled to yield a precipitate which was filtered, washed with cold acetone, and dried under reduced pressure over phosphorus pentoxide to yield 118 mg. of somewhat hygroscopic material, melting point 227–230° C. (dec.).

EXAMPLE 6

*2-amino-6-(2-phenylethyl)aminopurine*

Following the procedure previously described for the benzyl compound, 500 mg. of 6-methylthioguanine and 3 ml. of phenylethylamine were heated for 18 hours at about 150° C. The reaction mixture was taken up in ether, and reduced to a viscous oily mass under reduced pressure. This residue was repeatedly extracted with hot water and the clear supernatants were combined, and cooled in a refrigerator overnight, to yield 75 mg. of needles, melting point 202–203° C. (dec.).

EXAMPLE 7

Early curled Simpson var. lettuce seed were placed in 10 ml. of a 30 μg./ml. solution of each of the 2-amino-6-(substituted)-aminopurines indicated below and allowed to soak in the dark at 25° C. for about 1 hour. The seed were then recovered, blotted dry with filter paper to remove any excess pre-treatment solution, and placed in petri dishes on filter paper wet with water and allowed to germinate at 30° C. in the dark. Each test solution was run in duplicate so that the percentage of seed germinated at 24 and 48 hours could be determined. The results summarized below are an average of three assays:

| 2-Amino-6-(R)-aminopurine R = | Percent of seed germinated after— | |
|---|---|---|
| | 24 hours | 48 hours |
| Water blank control | 0 | 2 |
| Benzyl- | 19 | 86 |
| 2-Phenylethyl- | 3 | 35 |
| 2-Furfuryl- | 5 | 10 |
| 3-Pyridylmethyl- | 1 | 10 |
| 4-Pyridylmethyl- | 11 | 65 |

EXAMPLE 8

Using the general procedure described in Example 7, lettuce seed were pre-treated in the dark at 25° C. with a 10 ml. mixture of 100 μg./ml. of gibberellin and 30 μg./ml. of the 2-amino-6-(substituted)aminopurines indicated below. The gibberellin used was a commercial sample of gibberellic acid sold under the trade name "Gibrel." After pre-treatment for about 1 hour, the seed were drained, blotted dry with filter paper, and placed in petri dishes to germinate at about 30° C. in the dark for 24 and 48 hours. The tests summarized below are an average of three assays:

| 2-Amino-6-(R)-aminopurine R = | Percent of seed germinated after— | |
|---|---|---|
| | 24 hours | 48 hours |
| Water blank control | 0 | 2 |
| (Gibberellin alone, 100 μg./ml.) | (20) | (55) |
| Benzyl- | 65 | 95 |
| 2-Phenylethyl- | 50 | 90 |
| 2-Furfuryl- | 25 | 53 |
| 3-Pyridylmethyl- | 20 | 51 |
| 4-Pyridylmethyl- | 55 | 92 |

EXAMPLE 9

An assay medium was prepared as follows for use in testing present compounds results of which are summarized in Table 1.

| Component | Amount | Complete medium (40 tubes) |
|---|---|---|
| Double strength basal: | | |
|   Acid-hydrolyzed casein [a] | 100 ml. | |
|   Sodium acetate | 12 g. | |
|   Inorganic salts A [b] | 10 ml. | |
|   Inorganic salts B [c] | 10 ml. | |
|   L-Asparagine | 200 mg. | |
|   L-Cystine | 200 mg. | |
|   L-Tryptophan | 200 mg. | |
|   Water to make total volume | 1,000 ml. | 100 ml. |
| Purine-pyrimidine supplement: | | |
|   Adenine sulfate | 100 mg. | |
|   Guanine hydrochloride | 100 mg. | |
|   Thymine | 500 mg. | |
|   Uracil | 100 mg. | |
|   Water to make total volume [d] | 100 g. | 2.0 ml. |
| Formate supplement: | | |
|   Sodium formate | 1.0 g. | |
|   Water | 100 ml. | 2.0 ml. |
| Vitamin supplement: | | |
|   Pyridoxine hydrochloride | 50 mg. | |
|   Inositol | 15 mg. | |
|   Nicotinic acid | 3 mg. | |
|   Pantothenic acid (Ca salt) | 3 mg. | |
|   Riboflavine | 3 mg. | |
|   Thiamine hydrochloride | 3 mg. | |
|   p-Aminobenzoic acid | 3 mg. | |
|   Folic acid | 150 μg. (or folinic). | |
|   Biotin | 15 μg. | |
|   Water or 25% ethanol to make total volume. | 30 ml. | 0.4 ml. |
| Inhibitor: 2,4-Diamino-6,7-diphenylpteridine [e,f] | | 550 μg. |
| Glucose | | 2.0 g. |

[a] J. Bio. Chem., 143, 519 (1942).
[b] Salts solution A: $K_2HPO_4$ 25 g., $KH_2PO_4$ 25 g., water to make 250 ml.
[c] Salts solution B: $MgSO_4 \cdot 7H_2O$, 10 g.; NaCl, $FESO_4 \cdot 7H_2O$, and $MnSO_4 \cdot 5H_2O$, 0.5 g. each; water to make 250 ml.
[d] The compounds are dissolved with heating in 5–10 ml. of dilute hydrochloric acid, and water is then added to a total volume of 100 ml.
[e] J. Biol. Chem., 169, 689 (1947).
[f] Stock solution, 2.0 mg./ml. in 95% ethyl alcohol, stored away from light.

The complete double-strength medium was diluted with an equal volume of water, 2% (Difco) agar was added, and the medium was then autoclaved for 10 min. at 15 lb. pressure in cotton-plugged flasks; cooled to 40°, inoculated with 0.1 ml. of a saline suspension of *Lactobacillus arabinosus* 17–5 (A.T.C.C. No. 8014) per 100 ml. of medium, mixed rapidly and thoroughly, and poured into sterile glass containers (50 ml. into a 6 in. Petri dish). After hardening of the agar medium, 15 mm. diameter Whatman No. 1 filter paper disks, to which the samples to be tested had been applied, were placed on the surface of the agar with forceps, and left in place during incubation. The plates were incubated at 30° until background growth of the organism becomes clearly visible (24–48 hr.), and the zones of inhibition can easily be seen.

EXAMPLE 10

The following data were obtained using the same media and experimental technique described in Example 9 except that diaminodiphenylpteridine was omitted and amethopterin or aminopterin (0.01 ug./ml.) was included:

| Compound, 2-Amino-6-(R)-aminopurine R= | Weight of Compound per disc, µg. | Folic acid antagonist used | |
|---|---|---|---|
| | | Amethopterin | Aminopterin |
| | | Diameter of growth inhibition zone, mm. | |
| 2-Furfuryl- | 40 | 35 | 35 |
| Benzyl- | 40 | 33 | 34 |
| 2-Phenylethyl- | 40 | 36 | 37 |
| 3-Pyridylmethyl- | 40 | 28 | 30 |
| 4-Pyridylmethyl- | 40 | 25 | 26 |

We claim:
1. The compound 2-amino-6-(2-furfuryl)aminopurine.
2. The compound 2-amino-6-(3-pyridylmethyl)aminopurine.
3. The compound 2-amino-6-(4-pyridylmethyl)aminopurine.
4. A compound having the formula:

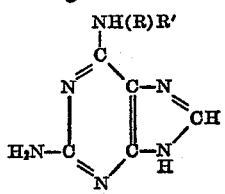

in which R is lower alkylene and R' is a furfuryl radical.

5. A compound having the formula:

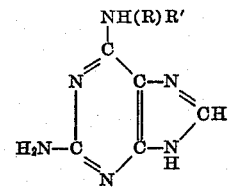

in which R is lower alkylene and R' is a pyridyl radical.

References Cited in the file of this patent

UNITED STATES PATENTS 2,844,576    Goldman et al. _____ July 22, 1958

OTHER REFERENCES

Skinner et al.: Jour. Amer. Chem. Soc., vol. 77, pages 6692–6693 (1955).